US008510284B2

(12) United States Patent
Nice et al.

(10) Patent No.: US 8,510,284 B2
(45) Date of Patent: Aug. 13, 2013

(54) LARGE-SCALE EVENT EVALUATION USING REALTIME PROCESSORS

(75) Inventors: Nir Nice, Kfar Veradim (IL); Daniel Sitton, Tel-Aviv (IL); Dror Kremer, Tel Aviv (IL); Michael Feldman, Pardesiya (IL)

(73) Assignee: Microsoft Corporation, Redmond, WA (US)

( * ) Notice: Subject to any disclaimer, the term of this patent is extended or adjusted under 35 U.S.C. 154(b) by 6 days.

(21) Appl. No.: 12/972,575

(22) Filed: Dec. 20, 2010

(65) Prior Publication Data

US 2012/0158783 A1 Jun. 21, 2012

(51) Int. Cl.
*G06F 17/30* (2006.01)
*G06F 7/00* (2006.01)

(52) U.S. Cl.
USPC .......................................... 707/706; 707/776

(58) Field of Classification Search
None
See application file for complete search history.

(56) References Cited

U.S. PATENT DOCUMENTS

| | | | |
|---|---|---|---|
| 6,336,139 B1 * | 1/2002 | Feridun et al. | 709/224 |
| 7,151,438 B1 | 12/2006 | Hall et al. | |
| 7,558,784 B2 | 7/2009 | Orumchian et al. | |
| 2004/0030616 A1 | 2/2004 | Florance et al. | |
| 2004/0249650 A1 * | 12/2004 | Freedman et al. | 705/1 |
| 2009/0018996 A1 | 1/2009 | Hunt et al. | |
| 2009/0070081 A1 | 3/2009 | Saenz et al. | |
| 2010/0168931 A1 | 7/2010 | Nasle | |

OTHER PUBLICATIONS

Abdelqader, Marwan, "OLTP and OLAP Real-Time Data Integration: Use of XML Messaging Technology in Trickle Feed Architecture to Achieve Near Real-Time Data Analytics"—Published Date: Nov. 10, 2006 http://ectd.du.edu/source/uploads/7762222.pdf.
Castellanos; et al., "Automating the Loading of Business Process Data Warehouses"—Published Date: Mar. 24-26, 2009, http://www.edbt.org/Proceedings/2009-StPetersburg/edbt/papers/p0612-Castellanos.pdf.
"The Reality of Real-Time Business Intelligence" Divyakant Agrawal, Aug. 24, 2008, Proceedings of the 2nd International Workshop on Business Intelligence for the Real Time Enterprise, Auckland, New Zealand, reprinted from the Internet at: http://birte08.stanford.edu/ppts/08-agrawal.pdf, 25 pgs.

* cited by examiner

*Primary Examiner* — Charles Kim
*Assistant Examiner* — Miranda Huang
(74) *Attorney, Agent, or Firm* — Microsoft Corporation

(57) ABSTRACT

Large-scale event processing systems are often designed to perform data mining operations by storing a large set of events in a massive database, applying complex queries to the records of the events, and generating reports and notifications. However, because such queries are performed on very large data sets, the processing of the queries often introduces a significant delay between the occurrence of the events and the reporting or notification thereof. Instead, a large-scale event processing system may be devised as a large state machine organized according to an evaluation plan, comprising a graph of event processors that, in realtime, evaluate each event in an event stream to update an internal state of the event processor, and to perform responses when response conditions are met. The continuous monitoring and evaluation of the stream of events may therefore enable the event processing system to provide realtime responses and notifications of complex queries.

20 Claims, 6 Drawing Sheets

LARGE-SCALE EVENT EVALUATION USING REALTIME PROCESSORS

BACKGROUND

Within the field of computing, many scenarios involve a set of events to be evaluated through data mining. As a first example, the events may comprise the actions of a set of customers interacting with a commercial store, website, product, or service, and the actions may be evaluated to identify consumer trends. As a second example, the events may comprise the actions of individuals comprising a demographic, a group, or an organization, and the actions may be evaluated to identify patterns of behavior of behavior among the individuals. As a third example, the events may comprise the actions of users who wish to receive services and information that may be of interest to the users. As a fourth example, the events may comprise measurements of a system, such as a machine or an environment that are to be evaluated to monitor the state of the system on behalf of an administrator. As a fifth example, the events may comprise measurements performed in a technical or scientific study, and the evaluation may be performed to identify relevant information.

Many such processing systems are centered around a large database and the evaluation of data stored therein. For example, many such processing systems are designed as a server farm, comprising a large number of database servers interoperating as a distributed database, and configured to generate various queries to be applied to a very large data set stored therein. This information may be stored, e.g., as a large set of tables comprising interrelated records, where such tables and records may be distributed across the database servers comprising the server farm. As an example of such large-scale processing, many such data processing systems utilize a MapReduce-based framework, wherein a central coordinating system may evaluate a query by identifying various query components, distributing each query component to a database servers storing information relevant to the query component, and compositing the query results generated by each database server to generate a query response. Such databases are often designed to store a large amount of data gathered over a period of time, and to apply large and complex queries to large numbers of records (potentially comprising billions of records gathered over a long period of time), and the evaluation of such queries may eventually result in a result set comprising portions of the records satisfying the criteria of the query.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Event processing systems centrally designed around records stored in a database may present many advantages, e.g., a detailed evaluation of nuances of events detected over a long period of time. However, such database systems may involve some disadvantages. First, the application of a query to a large data set may take a while to execute against the large data set. For example, reports based on various queries may be periodically generated, but the frequency of such reports may introduce a delay between the occurrence of an event and the results of the report, thereby limiting the responsiveness to recent events by recipients (e.g., individuals and processes) who receive the report. As a second example, the administrative storage of a large volume of historic information may be very costly, involving the administration and costs of acquiring and maintaining large storage systems. As a third example, the recipients of a report may have little interest in the fine-grain details of events stored in the database, but rather are interested only in the high-level reports resulting from the evaluation. However, since the computation is performed after storing the information, the administrators may be unable to reduce the data footprint without losing details captured in the records of the events that influence the results of reports. Thus, many of the stored records may be too specific to be of much direct value to the administrators (while also imposing a significant administrative cost), yet the administrators may have to capture the information in order to receive the results of analyses utilizing such records.

Presented herein are techniques for improving the evaluation of events by large-scale processors. In accordance with these techniques, the evaluation of such events is not principally performed by storing records of such events in a database, and then applying a query to the database to generate a query result representing useful information. Rather, the processing system may be formulated as a large state machine, comprising a graph of realtime event processors operating as individual state machines and communicating with the other event processors. An evaluation plan may be provided (e.g., a stepwise logical process of evaluating a set of events), and for various evaluation stages of the evaluation plan, one or more event processors may be instantiated, each event processor having a set of response conditions that, when satisfied, cause the event processor to perform a response. When an event is received, the event processor may perform some processing on the event, update its internal state, and, if its response conditions are satisfied, perform the response (e.g., generating a report or notification, or communicating the event or a processing result to another event processor). Thus, the results and effects of the events and processing results are stored not in a database, but in the internal states of the state machines. Moreover, the monitoring and processing of a stream of events results in notifications and responses to queries based on the current internal states of the state machines, which have been generated from and reflect the history of the event stream. As a result, notifications and reports based on a long history of accumulated knowledge may be generated promptly after the detection of the event or the receipt of the query.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
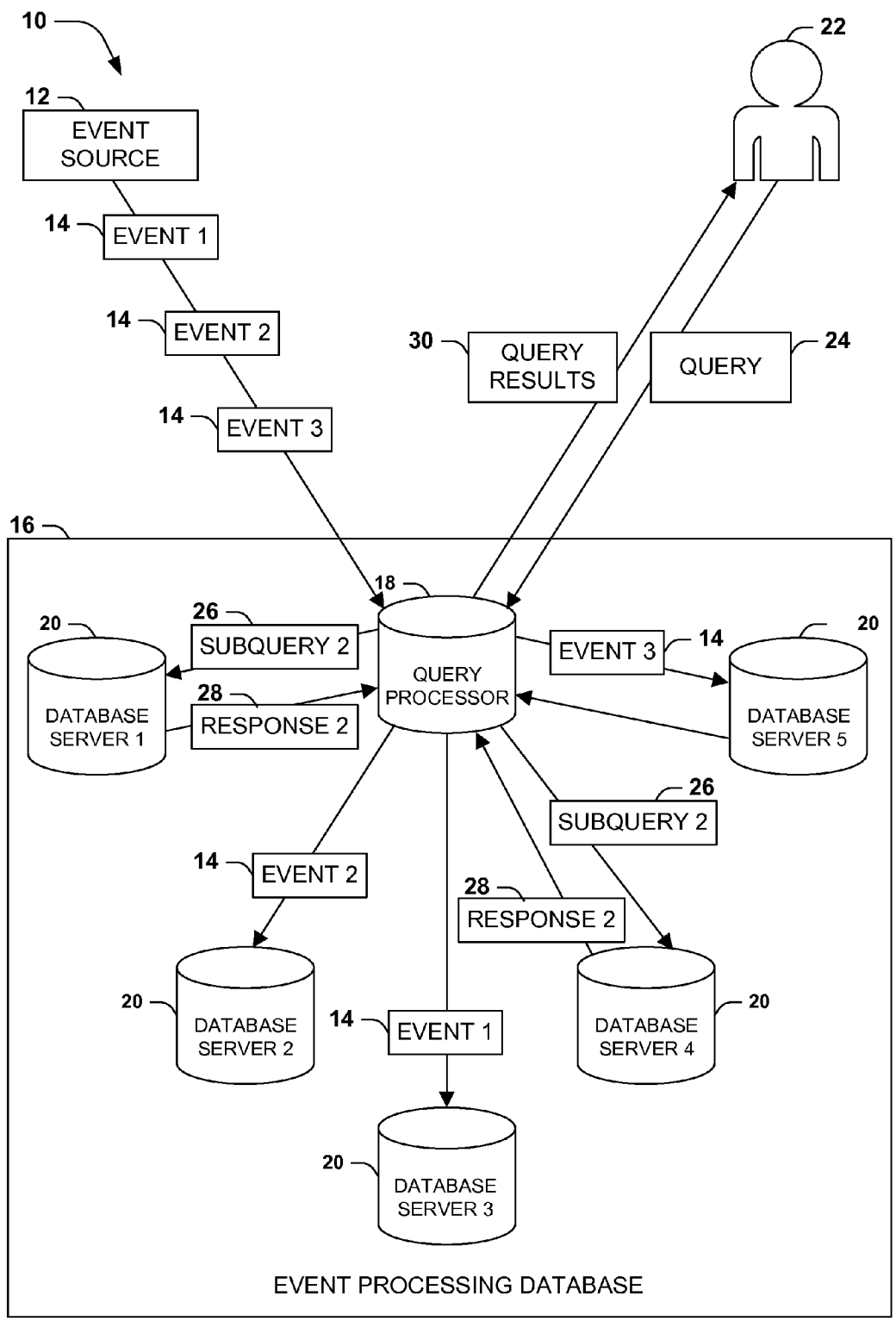
FIG. 1 is an illustration of an exemplary scenario featuring a processing of events received from an event source using an event processing database.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the processing of a large set of events received from an event source. The events may comprise, e.g., the actions of individuals, measurements of physical properties, or reports generated by automated processes. As a first example, the events of a set of consumers may be detected to observe consumer trends, such as the popularity of products and services, user experiences, and consumer decisions. As a second example, the events of a set of individuals, such as members of a community or an organization, may be detected to identify behavioral patterns, such as evaluating interactions and discussions occurring within a social network. As a third example, an end user may utilize a computer to track his or her actions in order to identify interests, present information related thereto, and take actions on behalf of the end user. As a fourth example, measurements of a system, such as a natural environment, a machine, or a processing plant, may be recorded to evaluate, analyze, and monitor the state of the system. As a fifth example, the events may arise within a field of technical or scientific research, such as medical events of individuals in a community, and may be evaluated to generate new information within the domain of the research. In these and other scenarios, a large set of data about the events may be generated and reported to a processing system for processing via data mining techniques. The evaluation may be directed, e.g., formulated by an administrator to retrieve information in response to specific queries, and/or undirected, e.g., automatically identifying significant patterns within the events that may be of interest to the administrator, such as clustering similar types of data or formulating knowledge or heuristics about the information domain of the events.

Many such systems are designed as a set of computers, such as a server farm, that together manages a large and complex database configured to store a large number of records (possibly numbering into the billions). For example, the database may be distributed over a large number of database servers, each configured to store a portion of the database (e.g., a subset of the tables of the database, and/or a subset of the records of one or more tables), and to apply various queries to the records stored therein. The database may also be structured as a series of layers, e.g., a first set of servers operating as a data storage layer configured to store the data, and a second set of servers operating as a business logic layer configured to access the data and perform complex evaluation of the data. These servers may support many types of operations, e.g., complex and historic analyses of the data, monitoring for events of particular interest, providing reports that summarize the data in various ways, and data mining to identify patterns and knowledge represented within the database.

One such technique that is often utilized in such event processing systems is the distribution of a query over a set of database servers. The MapReduce framework is often utilized for this task, and does so by providing a master node having information about the other database servers comprising the event processing system. Upon receiving a query, the master node may seek to decompose the query into various subqueries, each pertaining to a subset of data that is stored on a particular subset of database servers. For example, if a query involves a combined evaluation of three tables, the master node may seek to find one or more database servers that are currently storing the respective tables, and may send a subquery to each database server querying the data stored thereby. Upon receiving the results of the query evaluation from each database server, the master node may compose the results into a result set that is responsive to the query, and may provide it to the individual or process that submitted the query.

FIG. 1 presents an illustration of an exemplary scenario 10 featuring a set of computers operating together as an event processing database 16. In this exemplary scenario 10, an event source 12 generates a series of events 14 that are reported to the event processing database 16 for evaluation. A query processor 18 of the event processing database 16 may accept the events 14, identify one or more database servers 20 storing the event 14, and provide the event 14 to the identified database server(s) 20 for storage in the database. Additionally, when a user 22 submits a query 24, the query processor 18 may receive the query 18 and evaluate it to identify various subqueries 26 involving various portions of the database (e.g., a join query specifying a selection from first table and a selection from a second table) and the database servers 20 storing such portions. The query processor 18 may then send the subqueries 26 to one or more database servers 20 for evaluation. Each database server 20 may receive a subquery 26, process it against the locally stored portion of the database, and return a response 28, such as a selection or projection of data. The query processor 18 may then receive the responses 28 and composite a set of query results 30 to return to the user 22. In this manner, the event processing database 16 may scale up to handle the storage of a vast number of records (e.g., billions of records of various events 14) and the application of complex queries to achieve sophisticated analyses. Additionally, data mining techniques may be applied to identify new information represented in the events, such as patterns of events 14, classifications and clusters of events 14, and heuristics.

While event processing database 16 in the exemplary scenario 10 of FIG. 1 presents some advantages, some disadvantages may also arise from the design of the processing system around a large database. As a first example, the storage of a large database involves significant cost in acquiring the storage and processing hardware, and in configuring and administrating the event processing system 16. For example, administrators may expend considerable attention in designing, implementing, securing, and maintaining the data stores, the database contained therein, and the interrelationships of the query processor 18 and the database servers 20. Moreover, the storage of a large number of events 14 with a high degree of granularity may not be cost-effective. For example, a complex query applied against the database may generate high-level results (e.g., macroanalyses and extracted knowledge) from the low-level records stored in the database, but otherwise, the storage of voluminous low-level data may impose a significant administrative cost without significant benefit. Yet, it may not be feasible to cull the voluminous low-level data, since the execution of future queries 24 may be skewed if not applied against older events 14 as well as newer events 14.

As a second example, the processing of any query 24 against the large number of records stored in the database may involve considerable computational resources, since the queries may potentially be executed over a large number and/or complexity of records. As a result, the processing of each query 24 may involve a considerable expenditure of computing resources and a considerable delay. Accordingly, complex queries 24 are often executed only periodically, e.g., once per week. Additionally, the event processing database 16 may be unable to monitor events 12 continuously for updates or changes. As a result, the event processing database 16 may be unable to provide continuous, realtime reports and notifications in response to newly received events 14. The delay imposed between the receipt of events 12 and the notification or reporting of query results 30 to a user 22 may diminish the value of thereof. For example, if a complex query is executed weekly, a user 22 may not be notified of events 14 until up to a week after occurrence. This delay may be costly in circumstances where rapid responsiveness may be of significant value.

As a third example, an event processing database 16 may not be able to continue evaluating a query 24 against events 14 in a continuous manner. In some scenarios, the event processing database 16 may, after evaluating a query 24 and generating query results 30, apply the query 24 to subsequently received events 14 and supplement the results with newly generated records based on such events 14. However, this supplemental approach does not holistically reevaluate the query 24 against the entire database. For example, in a data mining technique that involves a clustering of events 14 into distinctive types, a first evaluation of the query 24 may identify some clusters of events 14, and continued evaluation of newly received events 14 may classify events 14 into previously identified clusters, and may also identify new clusters comprising events 14 that are markedly different from the previously identified clusters. However, the supplemental evaluation of new events cannot reassess the previously identified clusters in view of the new events 14 without reevaluating the query 24 holistically against the entire database.

This inefficiency may arise, in significant part, from the statelessness of the event processing database 16 in the evaluation of each query 24 anew. For example, the processing of a query 24 involves the current set of records and the operations specified in the query 24, but does not include knowledge or previous computations arising from previously generated queries 24. For example, executing the same query 24 repeatedly on the database involves gathering the same records and performing the same evaluation thereupon. Instead, the event processing database 16 reevaluating the referenced data set from scratch for each query 16. While caching techniques may improve the throughput of the query 24, the results of one query 24 do not meaningfully inform the results of further queries 24. In general, the event processing database 16 stores information and naïvely evaluates queries 24, but does not capture or utilize knowledge. Additionally, fine-grain data within the database that has already been evaluated may have to be preserved in order to achieve consistent results for future queries 24, because the evaluation of the query 14 can only utilize previously discovered knowledge by reprocessing the previously evaluated events 14 along with the subsequently received events 14. For example, in scenarios involve a clustering of events 14, the query 24 may differentiate events 14 into clusters based on heuristics discovered during the query 24. However, when the query 24 terminates, the heuristics may be discarded—e.g., the database may preserve the query results 30 (e.g., the identified clusters and the events 14 related thereto), but not the rationale whereby the clusters were selected. Accordingly, these rationale may not be available to the event processing database 16 while evaluating subsequently received events 14. Reevaluation may only be achievable by re-executing the entire query 24 against the entire database. This naïveté in the evaluation of events 14 may present significant limitations in the capabilities of the event processing system. For example, for complex queries 24, involving a large number of database records and/or complex processing of such records, continuous and realtime evaluation, or even frequent evaluation, may be cost-ineffective or simply unachievable. These and other disadvantages may arise from the implicit inefficiencies in using a large database to evaluate the events 14.

Presented herein are alternative techniques for evaluating events 14 received from an event source 12. These techniques involve modeling an event processing system not as a database to be naïvely queried for each query 24, but rather as a state machine. In these techniques, an evaluation plan is provided involving one or more evaluation stages involved in the evaluation of the events 14. The evaluation plan may be generated by a user 22 (such as an administrator) with or without the assistance of a computer. Using this evaluation plan, an event processor set may be generated, comprising event processors configured to perform an evaluation of events 14 for each evaluation stage of the evaluation plan. Each event processor may have an internal state, and upon completing an evaluation of an event 14, may update its internal state with the results of the evaluation. The event processor may therefore store knowledge extracted from the evaluation of events 14, and may retain and utilize that knowledge while evaluating subsequent events 14. Therefore, by comparing its internal state upon evaluating each event 14 and making adjustments, each event processor may retain the knowledge extracted during each evaluation, and may re-use and reexamine this knowledge while processing future events 14. Moreover, each event processor may also perform one or more responses based on whether or not the state of the of the event processor matches particular response conditions. For example, an event processor may notify a user 22 or administrator upon identifying significant changes in the state of the event processor, which may represent knowledge or significant information. Moreover, event processors may be interconnected, e.g., with event processors intercommunicating in response to the evaluation of events 14. Finally, the event processor set may be connected to the event source to initiate the monitoring of the events 14 generated thereby. Because the evaluation of each event 14 (including newly submitted queries 24) involves the examination of the internal states of the event processors instead of a naïve application of the query to the entire set of events 14 stored in the database, the event processors may be able to evaluate and respond to events 14 in a rapid manner. Accordingly, such evaluation may be performed continuously on an event stream. This may result in notifications, reports, and query results 30 that may be delivered in realtime, including both the latest events 14 in view of the knowledge extracted from the evaluation of all preceding events 14.

As one such example, an event processor set may be configured to identify patterns of individual preferences in movies that may be revealed through events 14 comprising the interactions of the individuals with a movie library. Individuals may perform various actions in such interactions, including searching for movies, browsing the titles and descriptions of movies, responding to recommendations of movies, and selecting movies for viewing, as well as actions performed while viewing the movies, such as pausing, skipping ahead or back, viewing again, and terminating without completing a viewing the movie. One individual may therefore generate many such events 14 during a viewing session, and thousands of individuals may generate a voluminous stream of such events 14. In accordance with the techniques presented herein, an evaluation plan may be devised (e.g., by an administrator of the event processing system, with or without the assistance of a computer) comprising various evaluation stages that may be applied to this task. Such evaluation stages may include, e.g., inferring the interests of an individual from the searches and selections of movies; clustering and classifying individuals based on demographics, inferred interests, and viewing history; and identifying heuristics that may be indicative of interests, such as actions that are highly correlated with high interest or low interest. This evaluation plan may then be implemented by automatically generating one or more event processors, each tasked with performing some or all of the evaluation for a particular evaluation stage. These event processors may then be interconnected to generate an event processor set that covers the evaluation stages of the evaluation plan. Finally, the event processor set may be connected to an event source, which may begin delivering a continuous stream of events 14 to the event processor set. The evaluation of each event 14 is rapid, e.g., because each event processor within the event processor set may perform a comparatively simple evaluation based on the event 14 and its current state. As a result, the event processor set may scale with acceptable performance to handle a large and continuous volume of events 14, thereby enabling a realtime generation of reports, notifications, and query results 30 in response to new information and knowledge identified in the stream of events 14, such as anomalies and developing trends.

Figure 2:
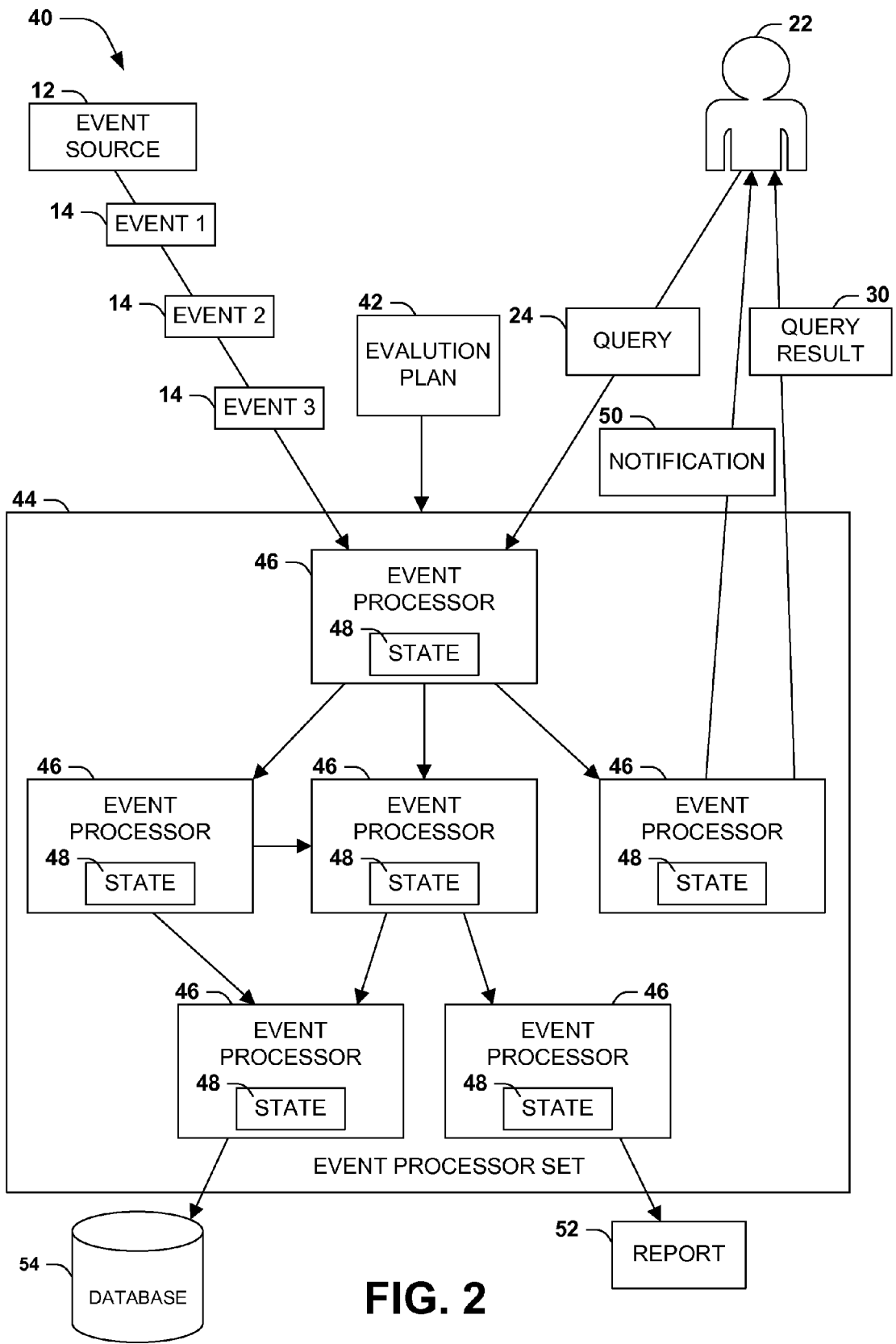
FIG. 2 is an illustration of an exemplary scenario featuring a processing of events received from an event source using a realtime event processing set according to the techniques presented herein.

FIG. 2 presents an illustration of an exemplary scenario 40 featuring an event processor set 44 configured to evaluate a stream of events 14 received from an event source 12 in accordance with the techniques presented herein. In this exemplary scenario 40, an evaluation plan 42 may be provided that comprises a set of evaluation stages to be applied to the events 14. An embodiment of these techniques may utilize the evaluation plan 42 to generate one or more event processors 46 for respective events stages of the event plan, each maintaining a state 48 that may be adjusted in view of information and knowledge extracted from the continuous evaluation of events 14. The event processors 46 may be interconnected to form an event processor set 44 reflecting the evaluation embodied in the evaluation plan 42. The event processor set 44 may then be connected to the event source 12, and may begin continuous evaluation of the stream of events 14 generated by the event source 12. Upon evaluating the events 14, respective event processors 46 may update the state 48 maintained therein, and may, if the state 48 satisfies a response condition, generate a response. For example, an event processor 46 may generate and deliver a query result in response to a query 24 submitted by a user 22, or may generate and send the user 22 a notification 50 (e.g., a notification 50 of a newly identified trend among the events 14, or of significant changes to the state 48 of the event processor 46 that may represent significant new information or knowledge). The event processors 46 may also perform other responses, e.g., generating a report 52 or storing information in a database 54 (e.g., recording significant events 14 in a database for that may then be subjected to traditional data mining techniques). These and other responses may be achieved in realtime, due to the continuous evaluation of events 14 from the event source 12 and the persistence of knowledge between evaluations, and may scale to handle a large and continuous volume of events 14 due to the rapid evaluation achievable by implementing the event processor set 44 as a state machine. These and other advantages may be achievable through the application of the techniques presented herein.

Figure 3:
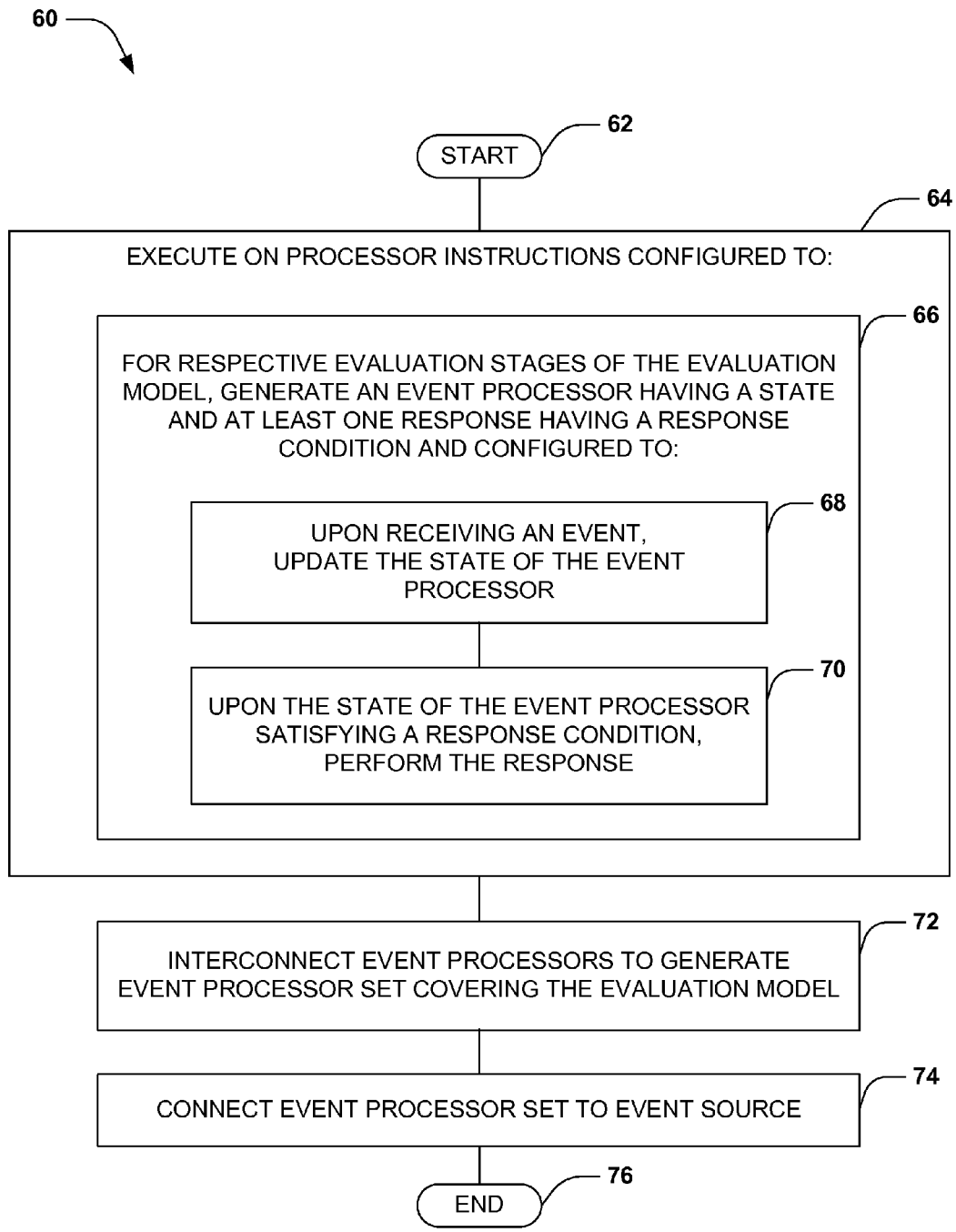
FIG. 3 is a flow chart illustrating an exemplary method of evaluating events received from an event source.

FIG. 3 presents a first embodiment of these techniques, illustrated as an exemplary method 60 of evaluating events 14 received from an event source 12 according to an evaluation plan 42. The exemplary method 60 may be implemented, e.g., as a set of software instructions stored in a memory component (e.g., a system memory circuit, a platter of a hard disk drive, a solid state storage device, or a magnetic or optical disc) of a device having a processor, that, when executed by the processor of the device, cause the processor to perform the techniques presented herein. The exemplary method 60 begins at 62 and involves executing 64 the instructions on the processor. More specifically, the instructions are configured to, for respective evaluation stages of the evaluation plan 42, generate 66 an event processor 46 having a state 48 and at least one response having a response condition. The event processor 46 is also configured to, upon receiving an event 14, update 68 the state of the event processor 46; and upon the state 48 of the event processor 44 satisfying a response condition, perform 70 the response. The instructions are also configured to interconnect 72 the event processors 46 to generate an event processor set 44 covering the evaluation plan 42. The instructions are also configured to connect 74 the event processor set 44 to the event source 12, thereby initiating the evaluation of the events 14. In this manner, the exemplary method 60 achieves the evaluation of the events 14 according to the techniques presented herein, and so ends at 76.

Figure 4:
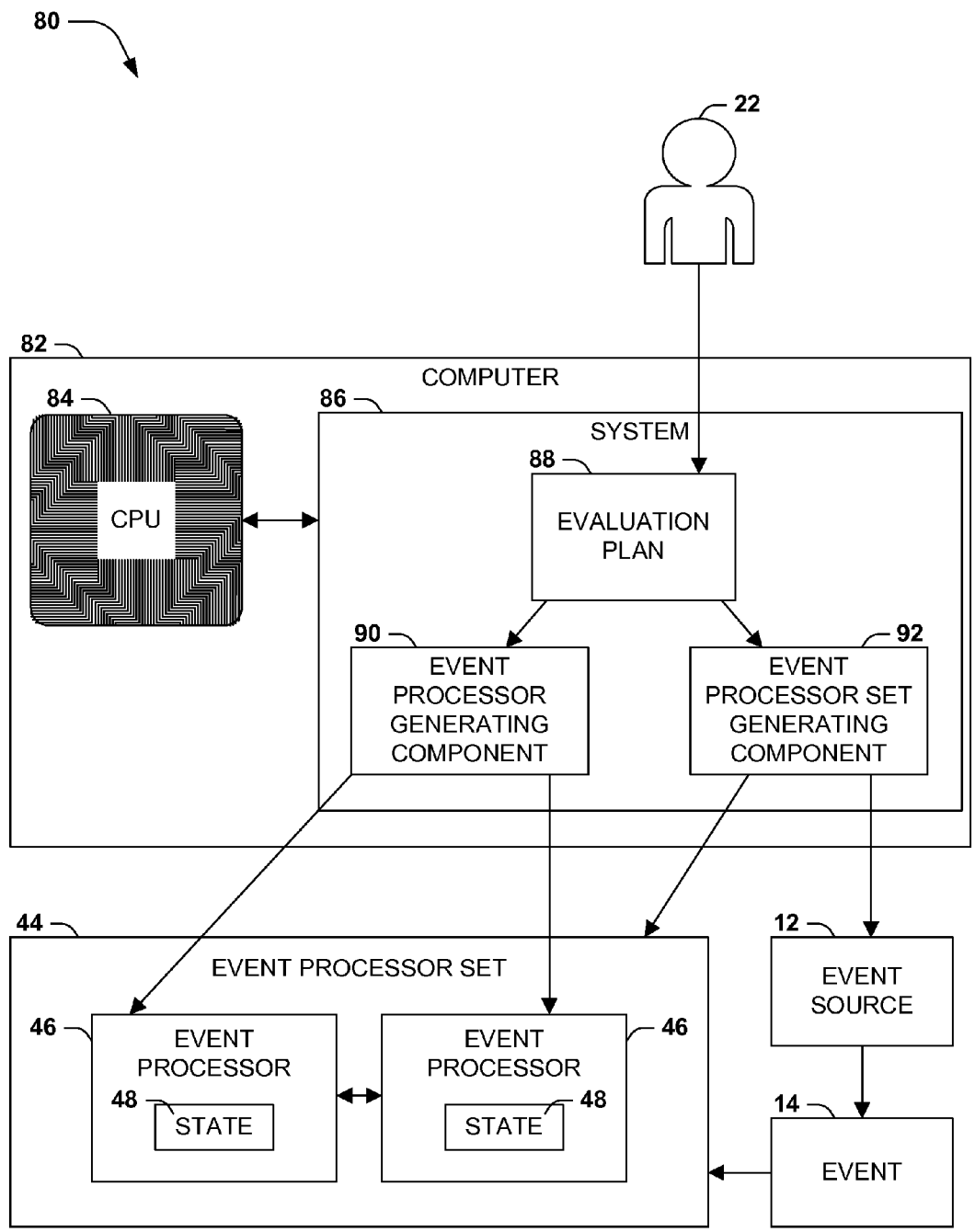
FIG. 4 is a component block diagram illustrating an exemplary system for evaluating events received from an event source.

FIG. 4 presents a second embodiment of these techniques, illustrated as an exemplary system 86 configured to evaluate events 14 received from an event source 12. The exemplary system 86 may be implemented, e.g., as a software architecture, comprising a set of components, each comprising a set of software instructions stored in a memory component (e.g., a system memory circuit, a platter of a hard disk drive, a solid state storage device, or a magnetic or optical disc) of a device 82 having a processor 84, such that, when executed (concurrently or consecutively) by the processor 84 of the device 82, cause the processor 84 to perform one or more tasks of the techniques presented herein. The exemplary system 86 includes an evaluation plan 88 specifying at least one evaluation stage of an evaluation of the events 14. The exemplary system 86 also includes an event processor generating component 90, which is configured to, for respective evaluation stages of the evaluation plan 88, generate an event processor 46 having a state 48 and at least one response having a response condition. The event processor 46 is further configured to, upon receiving an event 14, update the state 48 of the event processor 46; and upon the state 48 of the event processor 46 satisfying a response condition, perform the response. The exemplary system 86 also includes an event processor set generating component 92, which is configured to interconnect the event processors 46 to generate an event processor set 44 covering the evaluation plan 88, and connect the event processor set 44 to the event source 12. In this manner, the exemplary system 88 of FIG. 4 achieves the evaluation of events 14 received from the event source 12 according to the evaluation plan 88.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
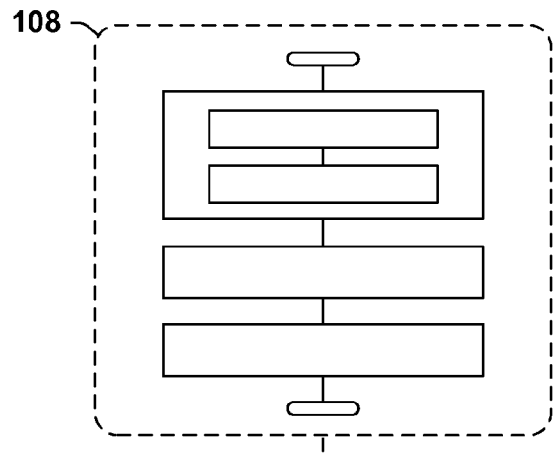
FIG. 5 is an illustration of an exemplary computer-readable medium comprising processor-executable instructions configured to embody one or more of the provisions set forth herein.
Figure 5:
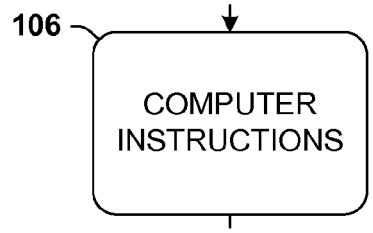
Figure 5:
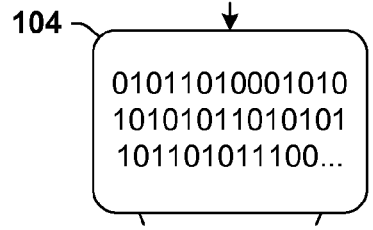
Figure 5:
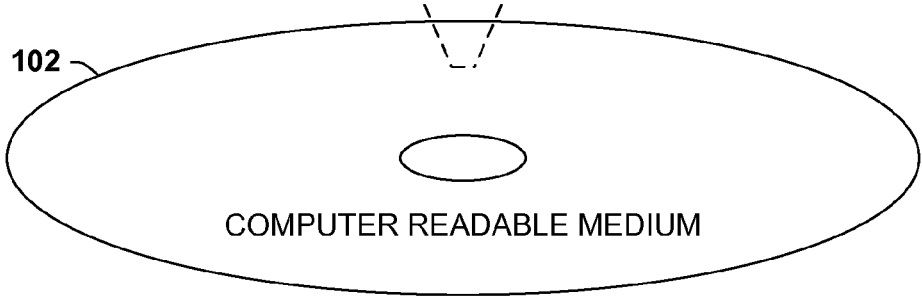

An exemplary computer-readable medium that may be devised in these ways is illustrated in FIG. 5, wherein the implementation 100 comprises a computer-readable medium 102 (e.g., a CD-R, DVD-R, or a platter of a hard disk drive), on which is encoded computer-readable data 104. This computer-readable data 104 in turn comprises a set of computer instructions 106 configured to operate according to the principles set forth herein. In one such embodiment, the processor-executable instructions 106 may be configured to perform a method of evaluating events received from an event source, such as the exemplary method 60 of FIG. 3. In another such embodiment, the processor-executable instructions 106 may be configured to implement a system for evaluating events received from an event source, such as the exemplary system 86 of FIG. 4. Some embodiments of this computer-readable medium may comprise a non-transitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 60 of FIG. 3 and the exemplary system 86 of FIG. 4) to confer individual and/or synergistic advantages upon such embodiments.

A first aspect that may vary among embodiments of these techniques relates to the scenarios wherein such techniques may be utilized. As a first example, these techniques may be utilized to evaluate many types of events 14, such as events generated by individuals, organizations, or automated processes. As a second example, these techniques may be combined with traditional data mining techniques. For example, in addition to performing responses, the event processors 46 may also store data in various databases, to which traditional data processing techniques may be utilized to extract additional information and knowledge. In turn, this information and knowledge may be utilized to update the state 48 of one or more event processors 46, and/or to update the evaluation plan 42, e.g., by adding or altering one or more evaluation stages thereof. As a third example, many architectures may be utilized to implement these techniques. For example, the respective event processors 46 may be implemented as separate machines, and/or as two or more software processes executing on one or more such machines. Those of ordinary skill in the art may devise many scenarios wherein the techniques presented herein may be utilized.

A second aspect that may vary among embodiments of these techniques relates to the generation of the evaluation plan 42. The evaluation plan 42 may be generated completely by one or more users, such as an administrator of the event processor set 44, and provided to an embodiment of these techniques (such as the exemplary system 86 of FIG. 4) to generate the event processor set 44 and the event processors 46 therein. However, in other scenarios, the evaluation plan 42 may be generated with the assistance of an embodiment of these techniques. In a first such variation, an embodiment may suggest aspects of the evaluation plan 42 that the user may wish to incorporate. For example, data mining techniques may be applied to a database of events 14 (either generated by another technique or generated by the event processor set 44) to extract knowledge and heuristics that may be suggested to the administrator to include in an evaluation plan 42. As one such example, in a scenario where the event processor set 44 is provided to evaluate individual interests in movies, data mining techniques applied to a database of events 14 representing the actions of individuals interacting with a movie library may indicate that viewing a movie more than twice is a strong indicator of individual interest, and that this type of event 14 may be advantageously included as an evaluation stage within the evaluation plan 42.

As a second variation of this second aspect, an embodiment of these techniques may endeavor to automate part of the generation of the evaluation plan 42. In particular, a user may identify one or more evaluation goals of the evaluation plan 42—e.g., the types of information, knowledge, and heuristics that the user endeavors to generate with the event processors set 44—and an embodiment of these techniques may automatically generate some parts of the evaluation plan 42 in furtherance of these evaluation goals. As a first such example, the user may specify a particular topic (e.g., the popularity of a movie star within a social network), and an embodiment of these techniques may automatically generate some parts of an evaluation plan 42 that identifies events 14 associated with the topic (e.g., identifying messages posted within the social network regarding the movie star, links to photos and articles about the website of the movie star, and reviews of the movies of the movie star, as well as an evaluation of the correlative weight of each type of event 14 to this topic). As a second such example, the user may specify a topic (such as a product), and an embodiment of these techniques may automatically generate parts of an evaluation plan 42 that identify other topics that are related to the topic (e.g., monitoring a commercial market to identify competing products and the popularity of such competing products among users). As a third such example, the user may specify an evaluation result to be derived from the events 14 (e.g., a type of report or data set, such as a general summary of topics discussed in a social network), and an embodiment of these techniques may automatically generate parts of an evaluation plan 42 whereby event processors 46 are utilized to generate the evaluation result. In these and other variations, an embodiment of these techniques may endeavor to assist an individual in generating the evaluation plan 44 in accordance with the techniques presented herein.

A third aspect that may vary among embodiments of these techniques relates to the operation of the event processors 46 of the event processor set 44 to evaluate the events 14. As a first variation, the event processors 46 may be configured, e.g., to evaluate respective events 14 according to a particular task to be achieved by the evaluation stage wherein the event processor 46 is positioned (e.g., by transforming incoming data into more useful outgoing data, e.g., by translating a foreign language message in a social network into a local language for easier processing by other event processors 46). Alternatively, the event processors 46 may be configured to shape the evaluation of events 14 through the event processor set 44. As one such example, the event processors 46 may be configured in order to perform taxonomy reduction, e.g., by filtering or summarizing events 14 such that the number of events 14 in an incoming event set that the event processor 46 receives and evaluates is larger the number of events 14 in the outgoing events set that the event processor 46 transmits (e.g., to another event processor 46, into a report or notification, or into a database), thereby reducing the amount of data exchanged and improving the significance of such data.

As a second variation of this third aspect, the types of responses performed by the event processors 46 may vary. As a first example, the event processors 46 may provide realtime notifications 50 of the information gleaned from the events 14, reports 52, and/or realtime query results 30 of one or more queries 24 submitted by a user 22. Alternatively or additionally, the event processors 46 may generate such notifications 50, reports 52, and/or query results 30 in a non-realtime manner, e.g., by periodically evaluating a set of events 14 in a deferred time frame. As a second example, the responses of one or more event processors 46 may involve storing a record of at least one event 14 (or a processing result of having evaluated such events 14) in a traditional data store, such as a database, for further evaluation by users 22 and/or other processes.

A third variation of this third aspect relates to the manner of saving the state of the event processor set 42. For example, one interesting characteristic of the event processor set 42 is that the information gleaned from the evaluation of events 14 is stored in the states 46 of the respective event processors 46; however, this characteristic also raises a potential vulnerability to the loss of such information, e.g., upon a machine or software process crashing. Therefore, it may be desirable to capture a snapshot of the states of 48 the event processors 46 of the event processor set 44, e.g., in order to evaluate the information contained in the event processor set 44 and/or to enable the event processor set 44 to be restored to this state at a later time. Moreover, it may be desirable to refrain from stopping the event processor set 44 from evaluating events 14 while capturing the snapshot, particularly where the event source 12 provides a continuous and heavy stream of events 14. Therefore, an embodiment of these techniques may store an event processor set snapshot, comprising the state 48 of each event processor 46 of the event processor set 44, while the event processor set 44 continues to operate.

A fourth variation of this third aspect relates to the manner of allowing users 22 to interact with the event processor set 44. For example, where the event processor set 44 is utilized to evaluate and report on the actions of users 22, it may be undesirable to include personally identifying information (PII) of any particular user 22 in any such report, such that the privacy and trust of the user 22 and others may be jeopardized. To this end, it may be advantageous to permit the user 22 to examine the information that has been captured about the user 22 and how such information is to be used various in various reports 52. Therefore, when an embodiment of these techniques receives a presentation request to present the state 46 of various processors 44 that involve the user 22, the embodiment may be configured to identify such event processors 46 and present the state 48 thereof to the user 22. Additionally, if the user 22 submits an adjustment request to adjust the state 48 of one or more event processors 46 (e.g., requesting to have some sensitive or personally identifying information removed), the embodiment may accordingly alter the state 48 of the event processor(s) 46. In this manner, the embodiment may extend to the users 22 monitored by the event processor set 44 a measure of review and/or control over the personal information that is collected and reported. Those of ordinary skill in the art may devise many ways of adjusting the execution of the event processor set 44 in accordance with the techniques presented herein.

A fourth aspect that may vary among embodiments of these techniques relates to updates to the evaluation plan 46 that may affect the configuration of the event processor set 44, e.g., the addition, removal, repositioning, and/or reconfiguring of one or more event processors 46. For example, a user 22, such as an administrator, may request to alter the evaluation plan 46 to adjust the details of the evaluation of events 14 and the responses generated by such event processors 46. Alternatively, the evaluation plan 46 may be informed by the results of the evaluation; e.g., new heuristics identified as potentially valuable in the evaluation of the events 14 may be incorporated as new or improved event processors 46. Therefore, an embodiment of these techniques may be configured to, upon receiving an updated evaluation plan, reconfigure the event processor set 44 to match the updated evaluation plan. However, it may be desirable to reduce the impact of the reconfiguration upon the continued operation of the event processor set 44, e.g., to permit the event processor set 44 to continue evaluating events 14 during the reconfiguration. Therefore, as a first variation of this fourth aspect, an embodiment of these techniques may be configured to identify one or more updated event processors that are affects by the updated evaluation plan 46, and, while the event processor set 44 remains connected to the event source 12 and continues evaluating the events 14, update only the updated event processors.

A second variation of this fourth aspect relates to the manner of updating the event processor set 44 with an updated evaluation plan 42 to evaluate new information. A particular problem may arise in this scenario, wherein the event processors 46 may not yet be informed of how to perform the evaluation (having not yet evaluated events 14 in this manner), and therefore being unable to generate accurate results until the state 48 of such event processors 46 is adapted to the new evaluation expressed in the updated evaluation plan. For example, the event processor set 44 may be newly tasked with identifying trends in the popularity of one or more topics in a social network, but without having been informed yet of the current popularity of such topics, the event processor set 44 may generate anomalous results until such familiarity is established. This "cold start" problem may be alleviated, e.g., by connecting the event processor set 44 to a historic event set, comprising a set of historic events that have previously been captured. For example, a data store of events 14 may be captured in a period preceding the updated evaluation plan, and may be run through the event processor set 44 (e.g., while suppressing output of the results until acceptable results are achieved) in order to achieve states 48 of the event processors 46 that generate acceptable results.

However, the training of the event processor set 44 with a historic event set may be costly; e.g., a large and varied set of historic events may be available (e.g., if such historic events have been captured in a data warehouse, such as in a traditional data mining scenario), and training the event processor set 44 with a large set of historic events may cause a delay in the availability of the event processing. Therefore, it may be desirable to reduce the size of the historic event set in order to achieve a training of the event processors 46 with high efficiency and/or reduced cost. As a first such example, where a large number of historic events may be available from a historic event source (e.g., a large database or capture of historic events), the historic events of the historic event set may be selected only in relation to the updated aspects of the evaluation plan 42, e.g., only including historic events 42 that are likely to be evaluated by one or more updated event processors 46. As a second such example, an embodiment of these techniques may limit the historic event set to a selection of historic events that match one or more historic event parameters (e.g., historic events occurring within a designated period, such as the week preceding the updating of the event processor set 44, or historic events involving one or more users 22 and/or topics). Such historic event parameters may be identified by a user 22, such as an administrator, or may be automatically selected by an embodiment of these techniques, e.g., by identifying historic event parameters that are likely to identify historic events of high training value to the event processor set 46.

As an additional variation, an embodiment of these techniques may be able to estimate a computational cost arising from connecting the event processor set 46 to a particular historic event set (e.g., an amount of time that will be involved in applying the event processor set to evaluate the historic event set, or an amount of storage space or bandwidth utilized in such training). The computational cost may be presented to a user 22, such as an administrator, to estimate the impact of training with a selected historic event set upon the functionality of the event processor set 44 (e.g., an amount of downtime of the event processor set 44 that may be caused by the training). The embodiment may therefore wait for the user 22 to verify the use of the historic event set in view of the estimated computational cost. Additionally, the user 22 may be permitted to adjust various historic event set parameters (e.g., the period and/or scope of historic events retrieved from the historic event source), to view the estimated computational costs of training with different historic event sets, and to select a historic event set that offers an acceptable tradeoff of training value and computational costs. In this manner, an embodiment of these techniques may facilitate an administrator or other user 22 in achieving a training of an updated event processor set 44 with a historic event set, thereby reducing the impact of the "cold start" problem on the utility of the results of the evaluation, while also managing the computational costs of such training. Those of ordinary skill in the art may devise many ways of updating the event processor set 44 in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
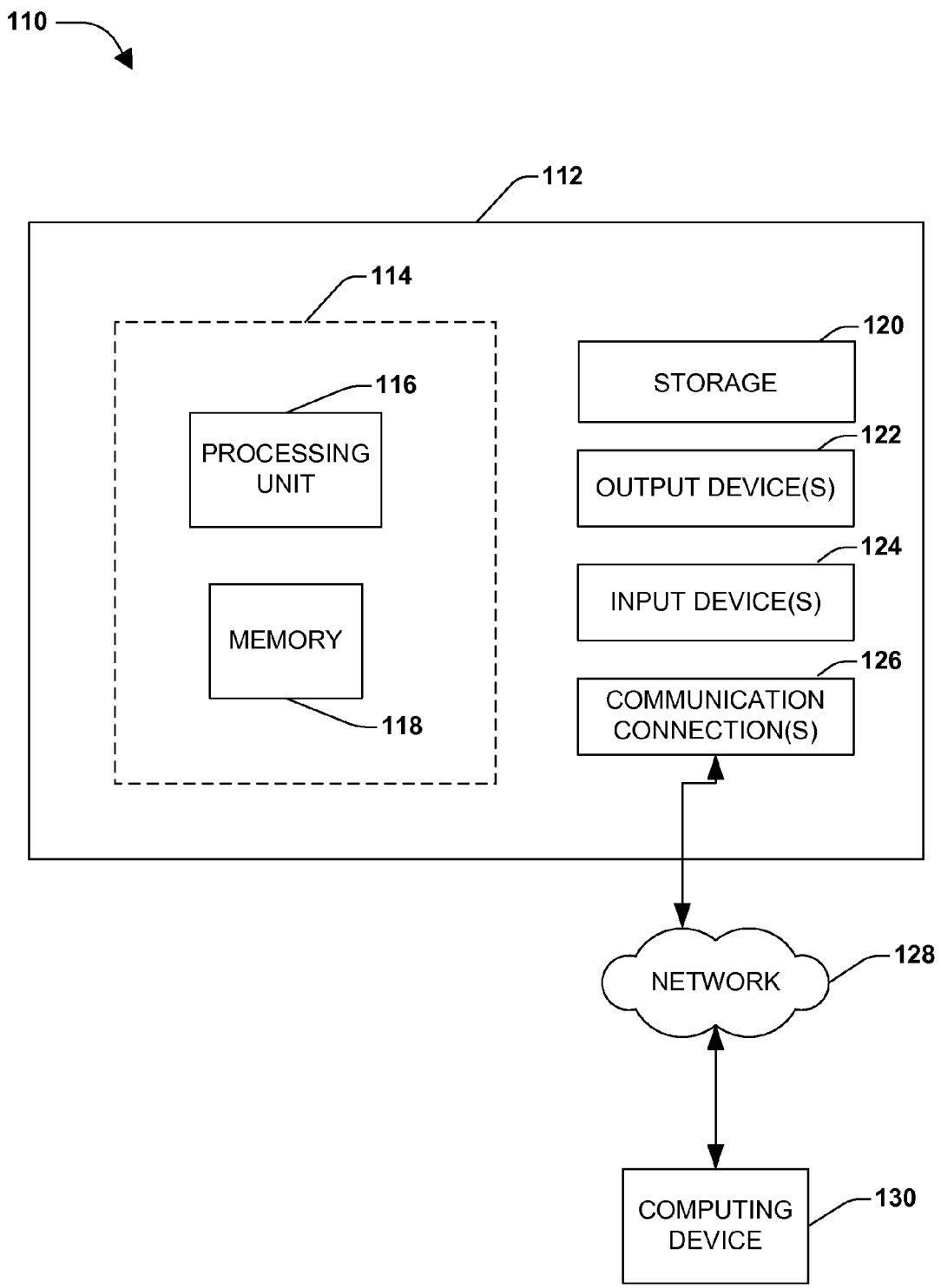
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 6 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 6 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection(s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device(s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:
1. A method of evaluating events received from an event source according to an evaluation plan on a computer having a processor, the method comprising:
  executing on the computer instructions configured to:
    for respective evaluation stages of the evaluation plan, generate at least one event processor having a state and at least one response having a response condition and configured to:
      upon receiving an event, update the state of the at least one event processor; and upon the state of the at least one event processor satisfying a response condition, perform the response;

interconnect all of the generated event processors to generate an event processor set covering the evaluation plan;

connect the event processor set to the event source;

upon receiving an event through the event source:
store the event in a historic event set, and
evaluate the events with the event processor set; and upon receiving an updated evaluation plan:
reconfigure the event processor set according to the updated evaluation plan; and
connect the reconfigured event processor set to at least a portion of the historic event set.

2. The method of claim 1, respective event processors configured to, for respective events, generate an outgoing event set that is smaller than the incoming event set.

3. The method of claim 1, the response comprising: generating a notification of an event.

4. The method of claim 1:
at least one event comprising a query received from a user; and
the response comprising: providing a report to the user in response to the query.

5. The method of claim 1:
the computer having access to a data store; and
the response comprising: storing at least one event in the data store.

6. The method of claim 1, the instructions configured to generate an evaluation plan using at least one evaluation goal specified by a user.

7. The method of claim 6:
the user specifying an evaluation result derived from the events, and
the evaluation goal comprising: evaluating the events to generate the evaluation result.

8. The method of claim 6:
the user specifying a topic, and
the evaluation goal comprising: identifying events associated with the topic.

9. The method of claim 6:
the user specifying a topic, and
the evaluation goal comprising: identifying other topics associated with the topic.

10. The method of claim 1:
the event processor set configured to store at least one event in a data store; and
the instructions configured to:
mine the data store to identify at least one evaluation goal, and
suggest the evaluation goal to the user.

11. The method of claim 1, reconfiguring the event processor set comprising:
identifying at least one updated event processor that is updated by the updated evaluation plan; and
while connecting the event processor set to the event source, updating only the updated event processors.

12. The method of claim 1:
the updated evaluation plan associated with at least one updated event processor; and
connecting the event processor set to at least a portion of the historic event set comprising:
identifying a selected portion of the historic event set comprising historic events associated with at least one updated event processor; and
connecting the event processor set to the selected portion of the historic event set.

13. The method of claim 1, the instructions configured to generate the historic event set by selecting, from a historic event source, historic events matching at least one historic event parameter.

14. The method of claim 13, the instructions configured to:
estimate a computational cost arising from connecting the event processor set to the historic event set; and
before connecting the historic event set to the event processor set, verify the computational cost with a user.

15. The method of claim 1, the instructions configured to:
upon receiving from a user a presentation request to present a state of at least one event processor in response to an event involving the user, present the state of the event processor; and
upon receiving from a user an adjustment request to adjust the state of at least one event processor, adjust the state of the at least one event processor.

16. The method of claim 1, the instructions configured to store an event processor set snapshot comprising the states of the event processors of the event processor set.

17. A nonvolatile computer-readable storage device comprising instructions that, when executed by a processor of a computer having access to a data store, evaluate events received from an event source by:
mining the data store to identify at least one evaluation goal;
suggesting the evaluation goal to a user;
generating an evaluation plan using at least one evaluation goal selected by the user;
for respective evaluation stages of the evaluation plan, generating at least one event processor having a state and at least one response having a response condition and configured to:
upon receiving an incoming event set comprising at least one event:
process the incoming event set according to the evaluation plan; and
update the state of at least one of the event processors; and
upon the state of at least one of the event processors satisfying a response condition:
perform the response including generating an outgoing event set that is smaller than the incoming event set; and
store at least one event in the data store;
interconnecting all of the generated event processors to generate an event processor set covering the evaluation plan;
upon receiving an updated evaluation plan:
identifying at least one updated event processor that is updated by the updated evaluation plan; and
reconfiguring the updated event processors according to the updated evaluation plan;
after reconfiguring the event processor set:
generating a historic event set comprising historic events selected from the data store matching at least one historic event parameter and associated with at least one updated event processor;
estimating a computational cost arising from connecting the at least one event processor set to the historic event set;
verifying the computational cost with the user;
connecting the reconfigured event processor set to a historic event set comprising at least one historic event;

upon receiving from a user a presentation request to present a state of at least one of the event processors in response to an event involving the user, present the state of the event processor;

upon receiving from a user an adjustment request to adjust the state of the at least one event processor, adjusting the state of the at least one event processor; and storing an event processor set snapshot comprising the states at least one of the event processors of the event processor set.

18. A nonvolatile computer-readable storage device comprising instructions that, when executed on a processor of a computer, evaluate events received from an event source according to an evaluation plan by:

for respective evaluation stages of the evaluation plan, generating at least one event processor having a state and at least one response having a response condition and configured to:

upon receiving an event, updating the state of the at least one event processor; and upon the state of the at least one event processor satisfying a response condition, performing the response;

interconnecting all of the generated event processors to generate an event processor set covering the evaluation plan;

connecting the event processor set to the event source;

upon receiving an event through the event source:
  storing the event in a historic event set, and
  evaluating the events with the event processor set; and upon receiving an updated evaluation plan:
  reconfiguring the event processor set according to the updated evaluation plan; and
  connecting the reconfigured event processor set to at least a portion of the historic event set.

19. The computer-readable storage device of claim 18, the instructions configured to generate the historic event set by selecting, from a historic event source, historic events matching at least one historic event parameter.

20. The computer-readable storage device of claim 19, the instructions configured to:

estimate a computational cost arising from connecting the event processor set to the historic event set; and before connecting the historic event set to the event processor set, verify the computational cost with a user.

* * * * *